April 10, 1945.  W. M. STOCKMAN  2,373,203
CUTTING IMPLEMENT
Filed Jan. 10, 1944

INVENTOR.
William M. Stockman
By: *[signature]*
ATTORNEY.

Patented Apr. 10, 1945

2,373,203

UNITED STATES PATENT OFFICE 2,373,203

CUTTING IMPLEMENT

William M. Stockman, New York, N. Y.

Application January 10, 1944, Serial No. 517,765

6 Claims. (Cl. 30—226)

The invention relates to improvements in cutting implements and more particular to a cutter for wire and the like.

Cutters for wire and the like usually are constructed of a multiple of pieces assembled into a unitary structure and frequently include one or more heat treated cutting tools firmly secured to head portions having pivotally connected handles or operating levers integral with or firmly attached to the head portions. Cutters constructed in that manner are expensive to manufacture primarily because of the tooling and assembly operations and also are frequently of such size, weight and bulk as to make them generally unsuited for general usage. It is, therefore, an object of the present invention to provide a light weight cutting implement of the kind to which this invention pertains which may be cheaply manufactured and easily assembled.

Another object of the present invention is to provide a cutting implement consisting of two principal parts each of which is identical with the other so as to thereby enable mass production of the parts from a minimum number of tools and simplicity in assembly and operation.

Another object of the invention is to provide a cutting implement of a kind described herein which has its principal parts formed of sheet material such as, for example, sheet metal, die cut and shaped so as to include also means to limit relative movement of the parts in one direction when pivotally joined one to the other.

A further object is to provide such principal parts with complemental cutting edges and means to insure co-operative relationship of said edges during the serviceable life of the implement.

Another object is to provide a combination cutting implement and screw driver consisting of but two principal parts.

Other and further objects of the present invention will be apparent from the following description and claims and are illustrated in the accompanying drawing which, by way of illustration, shows preferred embodiments and the principle thereof and which are considered to be the best modes for applying that principle. Other embodiments of the invention embodying the same or equivalent principle may be used and structural changes may be made as desired by those skilled in the art without departing from the present invention and the purview of the appended claims.

Figure 1:
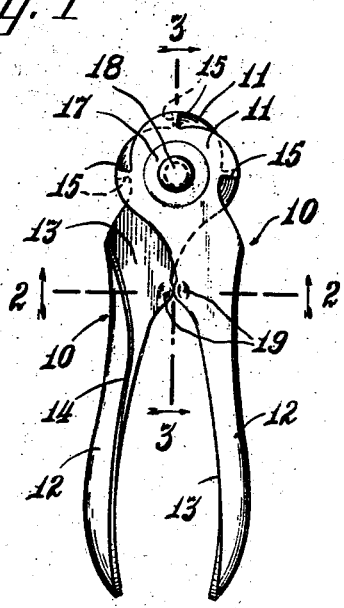
Fig. 1 is an elevational view of a cutting implement embodying features of the present invention.
Figure 2:
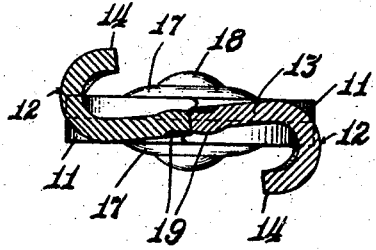
Fig. 2 is a sectional view taken on line 2—2 of Fig. 1.
Figure 3:
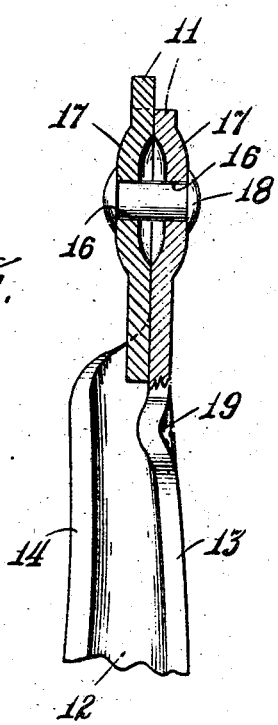
Fig. 3 is a fragmentary longitudinal sectional view taken on line 3—3 of Fig. 1.

Referring to the exemplification of the invention as disclosed in Figs. 1 to 3, inclusive, the cutting implement consists of two identical parts pivotally connected so as to have relative movement one with the other. Each part consists of an element 10 stamped from a single sheet of sheet steel, and includes a substantially circular flat head portion 11 and a handle portion or operating lever 12. The handle portion 12 is suitably shaped throughout its length to provide a comfortable hand-grip and is stamped substantially U-shaped in section to provide a wall portion 13 co-extensive with the flat head portion 11 and a companion spaced wall portion 14.

The head portion 11 has a plurality of radial cutting edges 15 in its peripheral margin and it is formed with a central hole 16. The circular area of the head portion 11 surrounding the hole 16 is upset or dished so as to provide a raised area 17 on one face thereof.

To assemble, the two identical elements 10 are arranged with the dished or concave faces of their otherwise flat head portions 11 in face to face abutment as best shown in Fig. 3, and a rivet 18 is extended through the aligned holes 16 to secure the two elements together pivotally. When pivotally joined in the manner hereinabove mentioned, the related cutting edges 15 of the head portions 11 are in opposed relation one to the other so that when the handle portions are moved apart, a gap is presented between each related opposed pair of cutting edges into which a wire or the like is positioned so as to be cut when the handle portions are again brought towards each other. Obviously, the opposed cutting edges defining a wire receiving gap will not serve to sever the wire in an efficient manner unless the head portions 11 are retained tightly in face to face abutment. Such tight abutment of the opposed faces of the head portions is maintained at all times irrespective of the amount of use given the device because of the presence of the areas 17 therein which cause said faces to be held together under tension resulting from the tight clamping effected during the riveting operation.

Relative movement of the handle portions towards each other is limited by providing suitable stops, one on each handle portion, such as for example, offset detents 19 which preferably are formed in the handle walls 13 during the stamping operation. It will be observed that the portion of the handle wall 13 of each handle portion, having the offset detent 18 therein is inclined inwardly from the plane of the related head portion so that when the two elements 10 are assembled as described hereinabove the offset detents 19 therein are in transverse alignment so as to abut one another and thereby serve the purpose for which they are intended.

Figure 4:
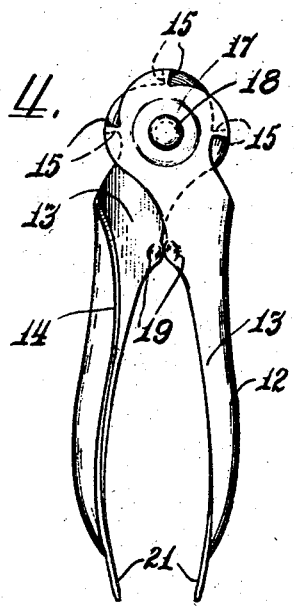
Fig. 4 is an elevational view of a modified form of cutting implement.

The exemplification of the cutting implement illustrated in Fig. 4 is with one exception like that described hereinabove and like numerals indicate corresponding parts. In this embodiment however, the free ends of the stamped handle portions 12 are each formed with screw driver extensions 21.

It should be apparent at this time that an inexpensive cutting implement and combination tool is provided by the novel structure herein disclosed. The device is formed of a minimum of parts, the two principal parts of course being identical one to the other so that a single set of dies serves to produce both parts and, due to the integral construction of the cutter head and handle portions and the unique formation of said head portions as well as the manner of pivotally connecting the parts, the implement is capable of withstanding rough usage and is very efficient in operation and use.

I claim:

1. In a tool of the character described, two like members, each of said members being stamped from a single piece of sheet material and including a substantially flat head and a handle portion, a plurality of radial cutting edges in the marginal area of said head, a stop element on an edge of said handle portion adjacent said head, said head having a central opening and an area surrounding said opening upset from the plane of said head, and a rivet extending through the aligned openings in said heads when the latter are arranged face to face with the upset areas disposed outwardly to pivotally secure the two members together, said rivet retaining the upset areas under tension to retain the heads in tight abutment to facilitate co-operative action of the cutting edges.

2. In a tool of the character described, two like members pivotally connected at one end, each of said members being stamped from a single piece of sheet material and including a substantially circular flat head and a handle portion substantially U-shaped in section, a plurality of radial cutting edges on the peripheral margin of said head, said head having a central opening and a circular area surrounding said opening upset from the plane of said head, and a rivet extending through the aligned openings in said heads when the latter are arranged face to face with the upset areas disposed outwardly to pivotally secure the two members together, said rivet retaining the upset areas under tension to retain the heads in tight abutment to facilitate co-operative action of the cutting edges.

3. In a tool of the character described, two like members, each of said members being stamped from a single piece of sheet material and including a substantially flat head and a handle portion having spaced walls, a plurality of radial cutting edges in the margin of said head, a detent offset on the marginal edge of one wall of said handle portion adjacent said head, said head having a central opening and a concave area surrounding said opening, a rivet extending through the aligned openings in said heads when the latter are arranged with their concave faces one against the other to pivotally secure the two members together, said rivet retaining the concave areas under tension to retain the heads in tight abutment to facilitate co-operative action of the cutting edges, and the detent offsets registering one with the other to limit movement of the handles towards each other.

4. In a tool of the character described, two like members pivotally connected at one end, each of said members being stamped from a single piece of sheet material and including a substantially circular flat head and a handle portion substantially U-shaped in section, a plurality of radial cutting edges in the peripheral margin of said head, a stop element on the marginal edge of one wall of said handle portion, said head having a central opening and a circular area surrounding said opening upset from the plane of said head, and a rivet extending through the aligned openings in said heads when the latter are arranged face to face with the upset areas disposed outwardly to pivotally secure the two members together, said rivet retaining the upset areas under tension to retain the heads in tight abutment to facilitate co-operative action of the cutting edges.

5. In a tool of the character described, two like members pivotally connected at one end, each of said members being stamped from a single piece of sheet material and including a substantially circular flat head and a handle portion substantially U-shaped in section, a plurality of radial cutting edges in the peripheral margin of said head, a stop element on the marginal edge of one wall of said handle portion, said head having a central opening, a circular area surrounding said opening upset from the plane of said head, and a rivet extending through the aligned openings in said heads when the latter are arranged face to face with the upset areas disposed outwardly to pivotally secure the two members together, said rivet retaining the upset areas under tension to retain the heads in tight abutment to facilitate co-operative action of the cutting edges and the stop elements registering one with the other to limit movement of the handles towards each other.

6. In a tool of the character described, a member stamped from a single piece of sheet material and including a substantially flat head and a handle portion, a plurality of cutting edges in the margin of said head, and a stop element on a marginal edge of the handle portion adjacent said head, said head having a central opening adapted to receive a rivet and an area surrounding said opening upset from the plane of said head, said upset area being adapted to be flexed when the member is pivotally attached to a complemental element by the rivet so as to urge the head of said member tightly against such element.

WILLIAM M. STOCKMAN.